(12) United States Patent
Byrne et al.

(10) Patent No.: US 7,584,127 B2
(45) Date of Patent: Sep. 1, 2009

(54) METHODS AND APPARATUS FOR UPDATING CREDIT BUREAU DATA

(76) Inventors: James P. Byrne, 101 Thorn Tree La., Winnetka, IL (US) 60093; Kevin Carp, 5845 Joanne Dr., Unit #201, Racine, WI (US) 54306

( * ) Notice: Subject to any disclaimer, the term of this patent is extended or adjusted under 35 U.S.C. 154(b) by 651 days.

(21) Appl. No.: 11/077,720

(22) Filed: Mar. 11, 2005

(65) Prior Publication Data
US 2006/0206418 A1    Sep. 14, 2006

(51) Int. Cl.
*G06Q 40/00* (2006.01)
(52) U.S. Cl. .................. 705/35; 705/44; 707/102; 707/200
(58) Field of Classification Search .............. 707/1, 707/10, 100, 102; 705/30, 31, 36 T, 38
See application file for complete search history.

(56) References Cited
U.S. PATENT DOCUMENTS

| | | | |
|---|---|---|---|
| 6,263,447 B1 * | 7/2001 | French et al. | 726/5 |
| 6,282,658 B2 * | 8/2001 | French et al. | 726/7 |
| 6,321,339 B1 * | 11/2001 | French et al. | 726/2 |
| 6,496,936 B1 * | 12/2002 | French et al. | 726/7 |
| 6,857,073 B2 * | 2/2005 | French et al. | 713/168 |
| 7,028,052 B2 * | 4/2006 | Chapman et al. | 707/104.1 |
| 7,234,156 B2 * | 6/2007 | French et al. | 726/2 |
| 7,370,044 B2 * | 5/2008 | Mulhern et al. | 707/6 |
| 2006/0041464 A1 * | 2/2006 | Powers et al. | 705/10 |

\* cited by examiner

*Primary Examiner*—Cheryl Lewis
(74) *Attorney, Agent, or Firm*—K&L Gates, LLP (57) ABSTRACT

Methods and apparatus to update credit bureau data are disclosed. The methods and apparatus provide a credit reporting transport server that stores credit information sent by the credit data providers. This data may be queued by the credit reporting transport server and forwarded to the credit bureau servers. Although credit data providers still receive credit reports based on this data from the credit bureaus, the data stored by the credit reporting transport server may be reviewed and modified by the submitting credit data provider at any time. Modified data is then sent to the credit bureaus to keep the credit bureau database up to date. In addition, the credit reporting transport server checks for errors, corrects some error, logs the transaction, and issues an electronic receipt to the credit data provider indicating the status of the data update.

8 Claims, 6 Drawing Sheets

View Report

Request Report

Derogatory Accounts

Consumer Information
PATRICK J METTLACH
1414 BEA ANN DR

Social Security
388-88-5056

Date of Birth
12/18/1963

DODGEVILLE WI 53533
(608) 935-7833 10/06/2003

Employment Information

No Records Found

| Original Creditor | Placed for Collection | Original Balance | Current Balance |
|---|---|---|---|
| UPLAND HILLS HEALTH INC | 01/30/2001 | $0.00 | $30.00 |
| Account Number : 0000000000000000002003071700120 | | | |
| Agency Name : Test Agency | | | |
| UPLAND HILLS HEALTH INC | 01/30/2001 | $0.00 | $156.00 |
| Account Number : 0000000000000000002003071700121 | | | |
| Agency Name : Test Agency | | | |
| UPLAND HILLS HEALTH INC | 01/29/2001 | $0.00 | $65.00 |
| Account Number : 0000000000000000002003071700124 | | | |
| Agency Name : Test Agency | | | |

METHODS AND APPARATUS FOR UPDATING CREDIT BUREAU DATA

TECHNICAL FIELD

The present disclosure relates in general to database services, and, in particular, to methods and apparatus for updating credit bureau data.

BACKGROUND

Often, when a person or company is extended financial credit and that person or company has failed to make timely payments (i.e., that credit is in default), the matter is turned over to a collection agency for resolution. Typically, the collection agency reports this "derogatory" credit information to one or more credit bureaus (e.g., Equifax, Experian, and/or TransUnion). Different collection agencies use different methods to report their credit information to the credit bureaus. Some collection agencies send their credit information to the bureaus once a month on a magnetic tape. Other collection agencies send their credit information to the bureaus on an irregular basis via various means, such as floppy disk or CD-ROM. Still others use different web technologies to transport their files. In addition, different credit bureaus may have different processes, procedures, and requirements for accepting data.

The credit bureaus then standardize the data coming in from hundreds of different collection agencies and store the data in a database. However, because of the large number of file transmissions being received, credit bureaus typically do not do an effective or timely job of matching and merging the records. The credit bureaus are receiving these data updates from derogatory sources as well as from many other sources associated with the data on a credit report. Typical data processing for one file transmission takes between 30 and 90 days. If certain fields are missing from an incoming record, the credit bureau may not effectively determine those missing fields by looking at other records associated with the same individual and/or the same collection agency. The credit bureau simply stores the record with one or more empty data fields or rejects the record completely. Subsequent attempts to retrieve that record by the missing field(s) will fail. Similarly, when that record is retrieved for a report (using other criteria), those filed(s) may be empty.

Subscribers to a credit bureau database may purchase information or request credit reports on individuals and companies. Certain collection agencies are both suppliers of credit data and subscribers to the database. A collection agency often requests data for accounts that they hold in collection. However, the collection agency may not directly update the retrieved data. The collection agency must resubmit the data to each of the credit bureaus and wait for the credit bureaus to update the database. After the data is resubmitted, the collection agency is not notified when the data is posted to the credit bureau database.

Alternatively, collection agencies may request a data update or correction by using an independent notification program called E-Oscar. For a monthly fee and a per transaction cost, collection agencies send e-mail based data updates directly to the credit bureaus. This e-mail does not constitute a direct file update, but is instead a way for collection agencies to inform a particular credit bureau that they believe an error exists in their submitted data. Most file updates, that are accepted by the bureaus in this manner, are posted to the credit bureau database within seven to ten days.

Each collection agency may be required to update more than one credit bureau with the same credit information using different formats. Similarly, each credit bureau must handle data updates coming from thousands of different collection agencies at different times in different manners. As a result, the time required to update the credit data can be days, weeks, or considerably longer.

A portion of the data is almost always out of date because collection agencies cannot access and update their data "in real time." This incorrect data often causes a problem. For example, if a customer pays off a debt or a mistake is discovered in the data, the delay in correcting the data in the credit bureau database may harm the person or company trying to make good on their credit rating to secure additional credit (e.g., to purchase a home). Similarly, this delay may result in credit being extended to a person or company that would otherwise have been avoided.

Often, this situation leads to conflicts between the collection agency and a person or company that has paid its debt. The debt payer blames the collection agency for the delay even if the collection agency has submitted the updated credit data.

SUMMARY

The methods and apparatus of the present system solve these problems by providing a credit reporting transport server. The credit reporting transport server functions between credit data providers (e.g., collection agencies) and the credit bureaus. The credit reporting transport server includes a database that stores credit information sent by the credit data providers. The received data is matched and merged with existing data based on the credit data provider. The merged data is queued by the credit reporting transport server and forwarded to the credit bureau servers in a timely manner (e.g., daily) for storage in the credit bureau database. This data clearinghouse will provide each bureau with an independent, standardized pipeline of updated data; thus aiding the data processing efforts of each bureau.

Although credit data providers still receive credit reports based on this data from the credit bureaus, the data in the credit reporting transport server database may be reviewed and modified by the submitting credit data provider (e.g., a collection agency, debt collector, credit card company, bank, lender, etc.) at any time. For example, a web browser interface may be used by a collection agency to update credit data originally submitted by that collection agency. The credit reporting transport server sends the modified data to the credit bureaus to keep the credit bureau database up to date.

The credit reporting transport server logs the transaction and issues an electronic receipt or acknowledgment to the credit data provider indicating the status of the data update. In this manner, the credit data provider is able to notify people and companies eager to see their credit data updated that the credit data provider has done its part to update the data.

DETAILED DESCRIPTION OF EXEMPLARY EMBODIMENTS

Figure 1:
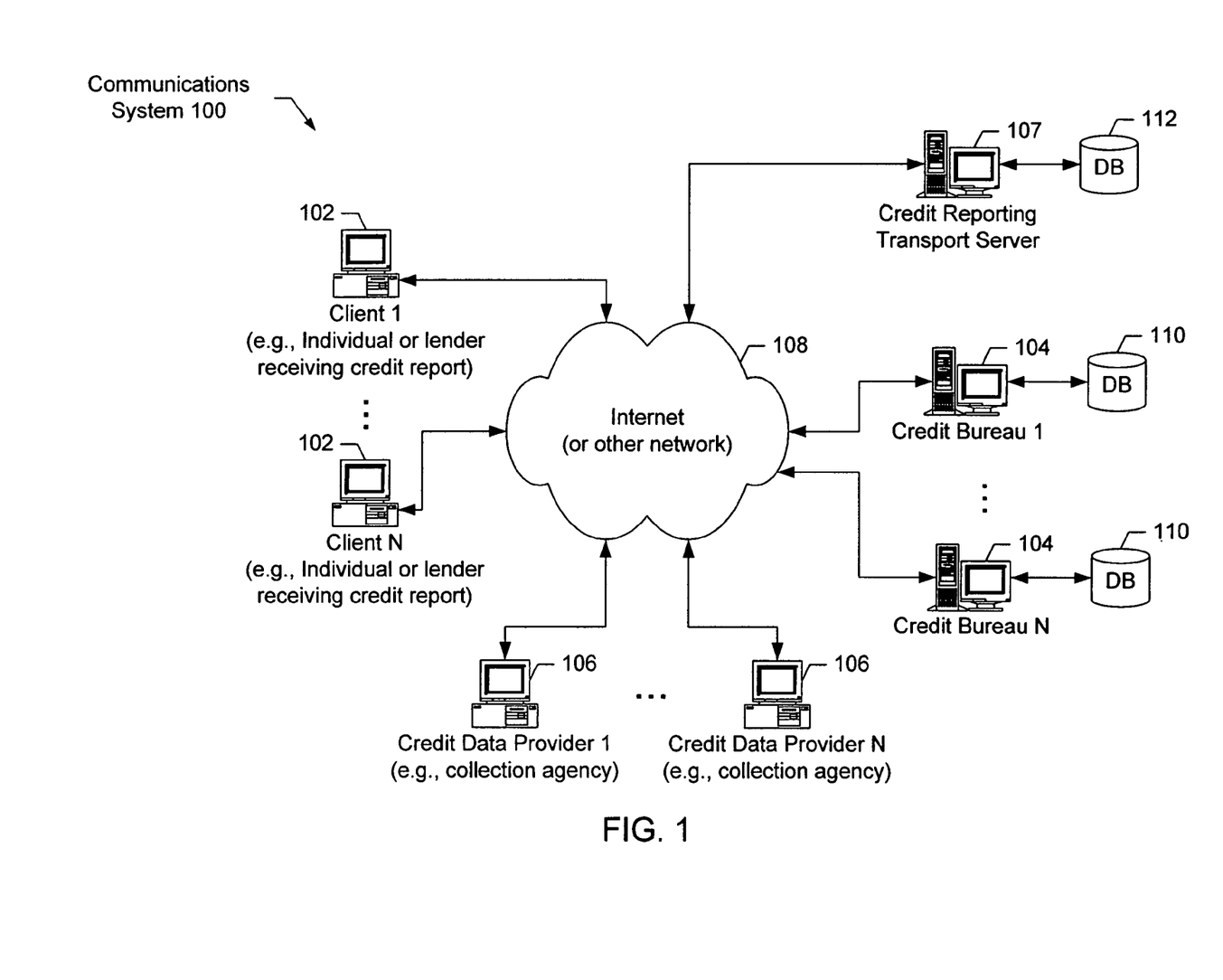
FIG. 1 is a high level block diagram of an example communications system.

The present system is most readily realized in a network communications system. A high level block diagram of an exemplary network communications system 100 is illustrated in FIG. 1. The illustrated system 100 includes one or more client devices 102, one or more credit bureau servers 104, one or more credit data provider computers 106, and one or more credit reporting transport servers 107. Each of these devices may communicate with each other via a connection to one or more communications channels 108 such as the Internet or some other data network, including, but not limited to, any suitable wide area network or local area network. It will be appreciated that any of the devices described herein may be directly connected to each other instead of over a network.

Figure 5:
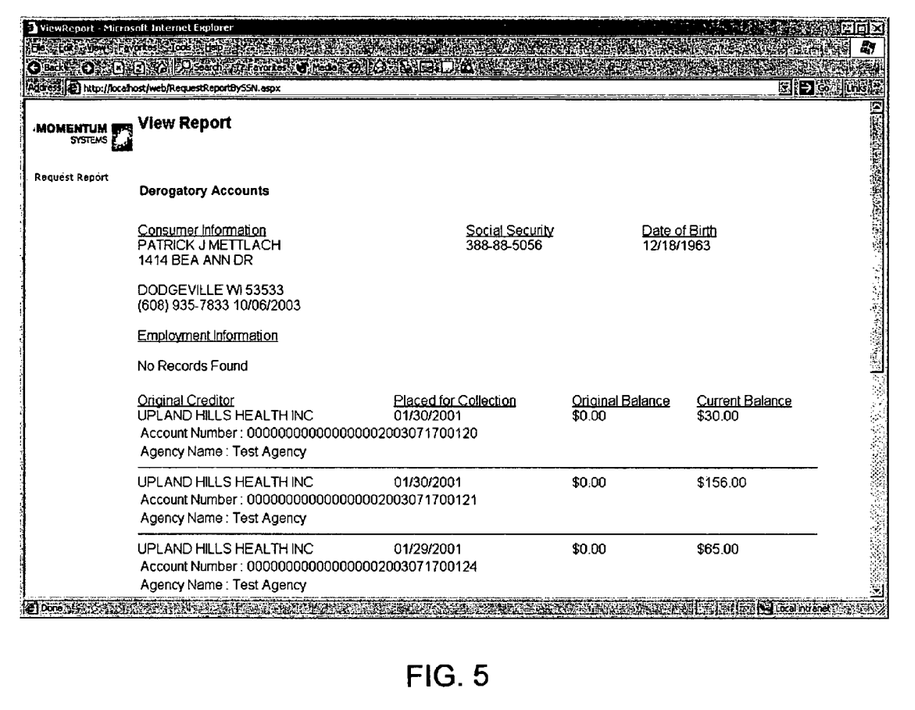
FIG. 5 is an example screen shot of a credit report.

Each credit bureau server 104 stores a plurality of files, programs, and/or web pages in one or more databases 110 for use by other devices in the system 100. The databases 110 may be connected directly to the credit bureau server 104 and/or via one or more network connections. The databases 110 store credit information used by the credit bureau server 104 to issue credit reports. For example, a client 102 or a credit data provider 106 may subscribe to a credit reporting service offered by a credit bureau server 104. The client 102 or the credit data provider 106 may then log in to the credit bureau server 104 to request a credit report. For example, a lender may run a credit check on a potential loan applicant in order to avoid bad debt. An example credit report is illustrated in FIG. 5. In this example, a user retrieved the credit report via a web browser.

The credit reporting transport server 107 also stores a plurality of files, programs, and/or web pages in one or more databases 112 for use by other devices in the system 100. The databases 112 may be connected directly to the credit reporting transport servers 107 and/or via one or more network connections. The databases 112 store credit information sent by the credit data providers 106. This data is then queued by the credit reporting transport server 107 and forwarded to the credit bureau servers 104 for storage in the credit bureau databases 110.

Although credit data providers 106 still receive credit reports based on this data from the credit bureaus 104, the data in the credit reporting transport server database 112 may be reviewed and modified by the submitting credit data provider 106 at any time via an online user interface. For example, a web browser interface may be used by a credit data provider 106 to update credit data originally submitted by that credit data provider 106. The credit reporting transport server then sends the modified data to the credit bureaus to keep the credit bureau database up to date.

In addition, the credit reporting transport server 107 logs the transaction and issues an electronic receipt to the credit data provider 106 indicating the status of the data update. In this manner, the credit data provider 106 is able to notify people and companies eager to see their credit data updated that the credit data provider 106 has done its part to update the data.

One server 104, 107 may interact with a large number of clients 102 and/or credit data provider computers 106. Accordingly, each server 104, 107 is typically a high end computer with a large storage capacity, one or more fast microprocessors, and one or more high speed network connections. Conversely, relative to a typical server 104, 107, each client device 102 and credit data provider computer 106 typically includes less storage capacity, a single microprocessor, and a single network connection.

Figure 2:
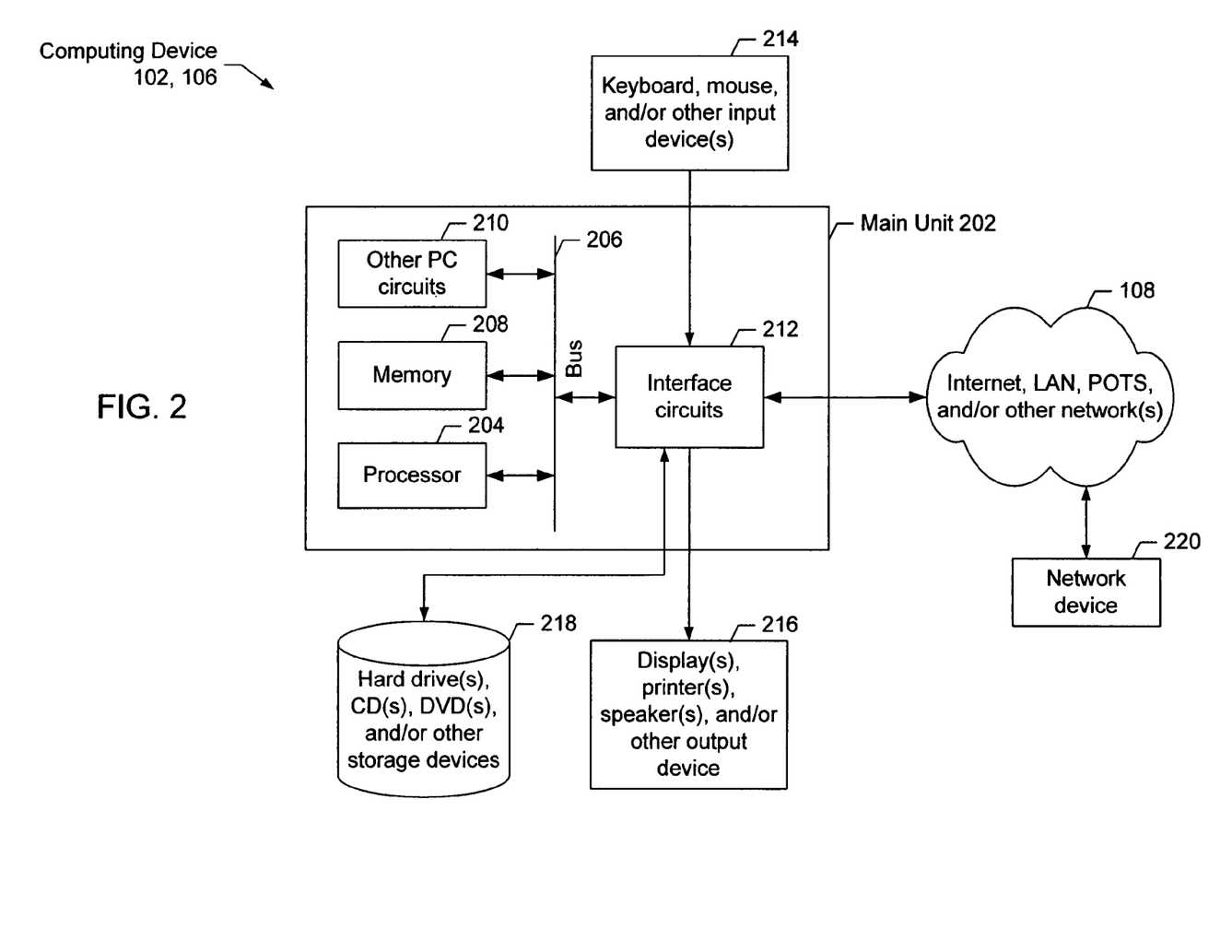
FIG. 2 is a more detailed block diagram showing one example of a computing device suitable for use as a client device and/or a credit data provider computer of FIG. 1.

A more detailed block diagram of a client device 102 and/or a credit data provider computer 106 is illustrated in FIG. 2. The computing device 102, 106 may include a personal computer (PC), a personal digital assistant (PDA), an Internet appliance, a cellular telephone, or any other suitable communication device. The computing device 102, 106 includes a main unit 202 which preferably includes one or more processors 204 electrically coupled by an address/data bus 206 to one or more memory devices 208, other computer circuitry 210, and one or more interface circuits 212. The processor 204 may be any suitable processor. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from another device in the system 100 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of suitable display. The display 216 generates visual displays of data generated during operation of the computing device 102, 106. The display 216 may be used to display web pages received from a server 104, 107. The visual displays may include prompts for human input, run time statistics, calculated values, data, etc. For example, the display may show a form used to update credit data residing on the credit reporting transport server database 112, or the display may show a credit report sent from a credit bureau 104.

One or more storage devices 218 may also be connected to the main unit 202 via the interface circuit 212. For example, a hard drive, CD drive, DVD drive, and/or other suitable storage devices may be connected to the main unit 202. The storage devices 218 may store any type of data used by the computing device 102, 106.

The computing device 102, 106 may also exchange data with other network devices 220 via a connection to the network 108. The network connection may be any type of suitable network connection, such as an Ethernet connection, digital subscriber line (DSL), telephone line, coaxial cable, etc. Users of the system 100 may be required to register with a server 104, 107. In such an instance, each user may choose a user identifier (e.g., e-mail address) and a password which may be required for the activation of services. The user identifier and password may be passed across the network 108 using encryption built into the user's browser. Alternatively, the user identifier and/or password may be assigned by the server 104, 107.

Users may connect to a server 104, 107 to access data and view or generate reports. Access to a server 104, 107, databases 110, 112 and/or reports can be controlled by appropriate security software or security measures. An individual member's access can be defined in the system and limited to certain data, information and reports. Access to non-authorized data, information and reports can be prohibited.

Figure 3:
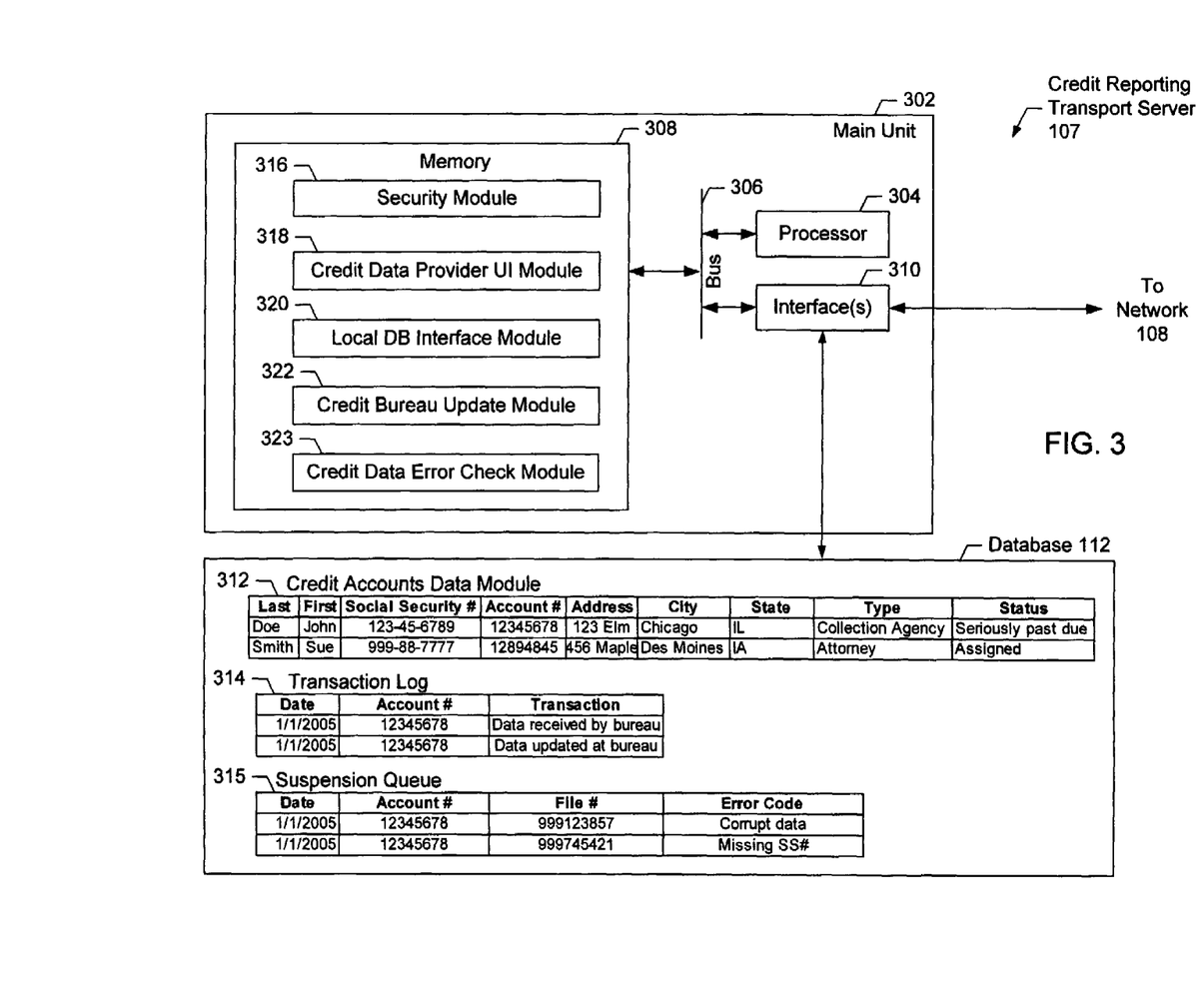
FIG. 3 is a more detailed block diagram showing one example of a server suitable for use as a credit bureau server and/or the credit reporting transport server of FIG. 1.

A more detailed block diagram of a server 104, 107 is illustrated in FIG. 3. Like the computing device 102, 106, the main unit 302 in a server 104, 107 preferably includes a processor 304 electrically coupled by an address/data bus 306 to a memory device 308 and a network interface circuit 310. The server 104, 107 may exchange data with other devices via a connection to the network 108. The network interface circuit 310 may be implemented using any suitable data transceiver, such as an Ethernet transceiver. The network 108 may be any type of suitable network, such as a local area network (LAN) and/or the Internet.

The processor 304 may be any type of suitable processor, and the memory device 308 preferably includes volatile memory and non-volatile memory. Preferably, the memory device 308 stores computer code or a software program that implements all or part of the method described below. This program may be executed by the processor 304 in any suitable manner. However, some of the steps described in the method below may be performed manually and/or without the use of a server 104, 107. The memory device 308 and/or a separate database 110 also store files, programs, web pages, etc. for use by other devices in the system 100.

More specifically, the memory device 308 and/or the database 112 of the credit reporting transport server 107 preferably includes a plurality of modules 312-323 that determine the overall functionality of the server 107. Each module 312-323 includes a set of computer readable instructions and/or data which are related to a designated subject matter, topic or purpose. This type of modular construction of the server 107 can be created using any suitable computer programming language and/or database, including, without limitation, JAVA, C++, SQL, etc. Although certain example modules 312-323 are described herein, it should be appreciated that the modules 312-323 of the server 107 may be structured in other ways including as a single module. In such a case, the single module would have the functionality of the separate modules illustrated in FIG. 3.

In the illustrated example, the database 112 includes a credit accounts data module 312, a transaction log data module 314, and a suspension queue 315. The illustrated memory device 308 includes a security module 316, a credit data provider user interface module 318, a local database interface module 320, a credit bureau update module 322, and a credit data error check module 323.

The credit accounts data module 312 stores derogatory credit data associated with people and/or companies as reported by the credit data providers 106. For example, the credit accounts data module 312 may store the person's name, social security number, account number, address, city, state, the account type, the account status, dollar amounts due dates, etc. The transaction log data module 314 logs each data update made by the credit data providers 106. For example, the transaction log data module 314 may log the date, the account number the transaction status, etc. The suspension queue 315 stores problematic credit data. For example, the suspension queue 315 may store a record received from a credit data provider 106 that does not have a valid social security number. Problematic credit data is preferably not forwarded to the credit bureau(s) 104.

The security module 316 allows a credit data provider 106 to view and update credit data associated with that credit data provider 106 without allowing the credit data provider 106 to view or update credit data associated with other credit data providers 106. The credit data provider user interface module 318 provides a user interface to the credit data provider computers 106 that enables the credit data providers 106 to view and update credit data associated with that credit data provider 106. For example, a collection of web pages may be dynamically generated by the credit data provider user interface module 318 that allow the credit data providers 106 to query and update the transport server database 112.

The local database interface module 320 interacts with the transport server database 112 to store and retrieve data from the credit accounts data module 312 and the transaction log data module 314. For example, when a credit data provider 106 interacts with the credit reporting transport server 107 to view existing credit data, the local database interface module 320 retrieves the requested data from the credit accounts data module 312 if authorized by the security module 316. Similarly, when a credit data provider 106 updates credit data, the local database interface module 320 stores the new data in to the credit accounts data module 312 if authorized by the security module 316. In each of these examples, the local database interface module 320 also records a new transaction in the transaction log data module 314. Subsequently, if a credit data provider 106 requires the status of a particular data update, the local database interface module 320 may retrieve status data form the transaction log data module 314 and provide the status data to the credit data provider 106 via the credit data provider user interface module 318.

When a credit data provider 106 updates credit data and/or at some periodic time (e.g., daily), the credit bureau update module 322 sends the updated data to the credit bureau(s) 104. For example, the credit bureau update module 322 may collect changes from hundreds of different credit data providers 106 each day and send those changes as one batch to each of the credit bureaus 104 using the Metro2 data format and/or the known eOscar system. In this example, each credit bureau 104 is still required to make the actual update to their database 110 (i.e., the submission form the credit reporting transport server 107 is merely a request to make the update). In another embodiment, the credit reporting transport server 107 is authorized by one or more of the credit bureaus 104 to make the update directly to the credit bureau database 110. In either case, the credit bureau 104 preferably sends an acknowledgment to the credit reporting transport server 107 indicating that the update was made to the credit bureau database 110 (i.e., a feedback loop). The credit reporting transport server 107 logs the update and/or sends the submitting credit data provider 106 an electronic receipt.

Some credit data received from the credit data providers 106 is not sent to the credit bureau(s) 104. Specifically, the credit data error check module 323 checks data received from the credit data providers 106 for a plurality of errors. For example, a submitted record may be missing the social security number. In some instances, the credit data error check module 323 is able to correct the detected error(s). For example, if the social security number is missing from a record, and that social security number can be determined from other records (e.g., with the same account number, name, address, phone number, etc.), the credit data error check module 323 may complete the missing social security number automatically.

If the error check module 323 is not able to correct the error(s) associated with a record received from a credit data provider 106, then the error check module 323 preferably stores the problematic record in the suspension queue 315 and notifies the credit data provider 106 that submitted the problematic record. In this manner, the credit data provider 106 can correct the error, and the credit reporting transport server 107 can send the correct data to the credit bureau(s) 104.

Figure 4:
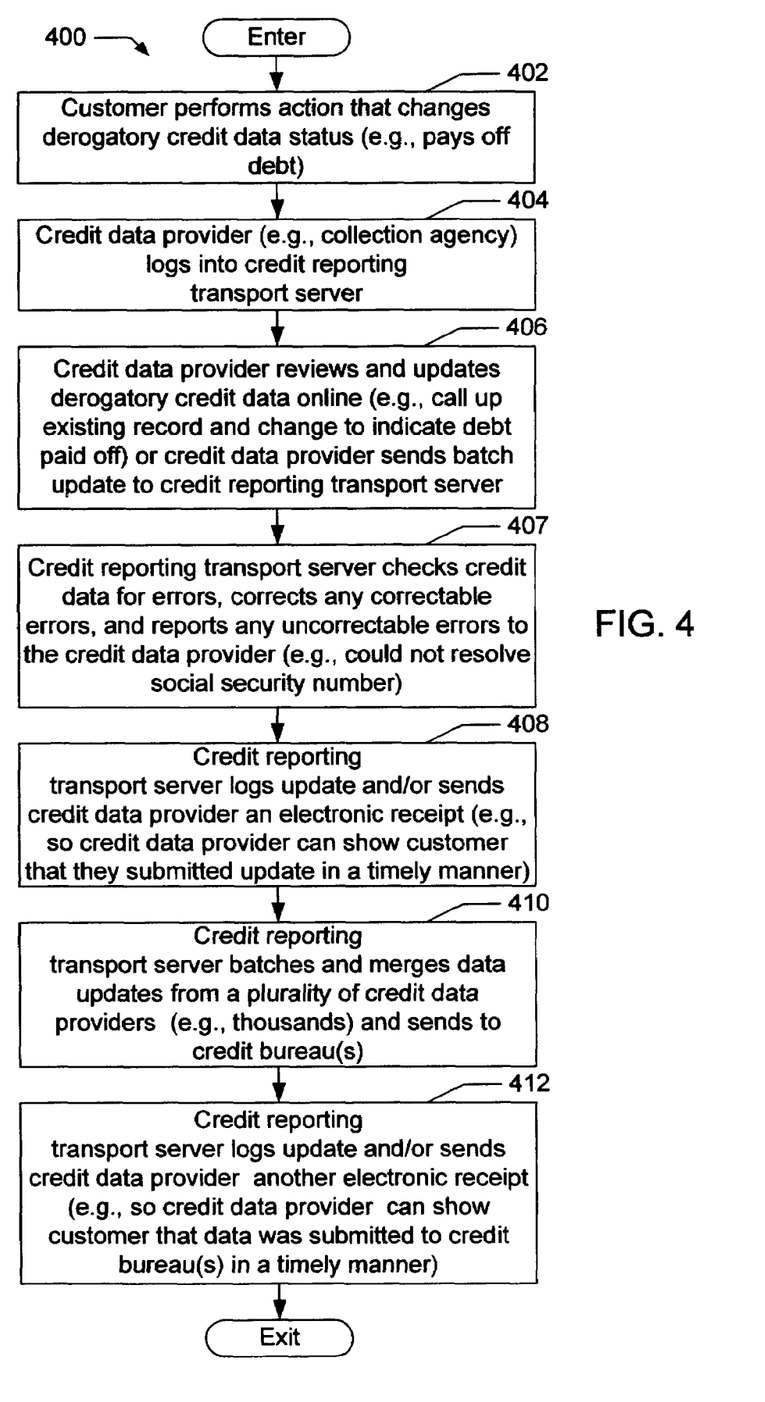
FIG. 4 is a flowchart of an example process to update credit bureau data according to one embodiment of the present methods and apparatus.

A flowchart of an example process 400 for updating credit bureau data is illustrated in FIG. 4. Preferably, the process 400 is embodied in one or more software programs which is stored in one or more memories and executed by one or more processors. Although the process 400 is described with reference to the flowchart illustrated in FIG. 4, it will be appreciated that many other methods of performing the acts associated with process 400 may be used. For example, the order of many of the steps may be changed, and many of the steps described may be optional.

Generally, the process 400 allows credit data providers 106 to log in to the credit reporting transport server 107 to add, review and update credit data. The data is then forwarded to one or more credit bureaus 104 and the transaction is logged. The process 400 begins when a person or company performs some action that changes that entity's derogatory credit data status as indicated in block 402. For example, a person may pay off a debt to a credit data provider 106. The credit data provider 106 then logs into the credit reporting transport server 107 as indicated in block 404. For example, the credit data provider 106 may log into the credit reporting transport server 107 via a secure web browser.

Figure 6:
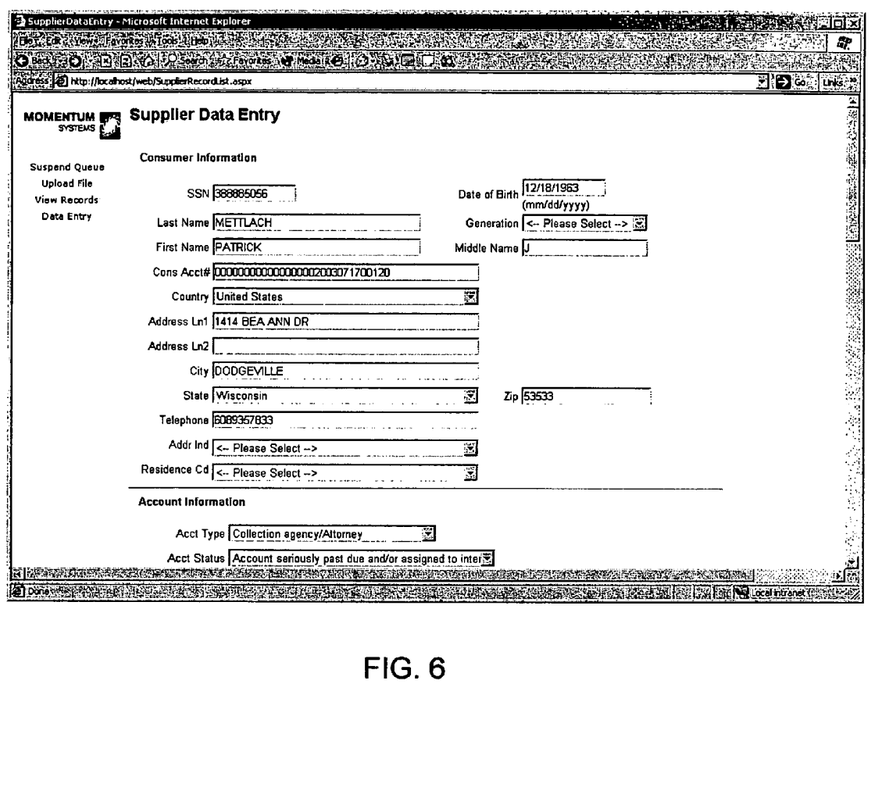
FIG. 6 is an example screen shot of an interactive credit data update interface.

Once logged in, the credit data provider 106 may review and update the derogatory credit data associated with any of that credit data provider's records as indicated in block 406. For example, the credit data provider 106 may call up an exiting record and change the data to indicate that person just paid off their debt (and possibly other people and/or companies). These updates are made interactively in the transport server database 112 via the credit reporting transport server 107. For example, the updates may be made via a web page as shown in FIG. 6. As a result, data in many existing fields (e.g., social security number) do not need to be reentered and are less likely to be missing. Alternatively, in a batch processing mode, the credit reporting transport server 107 matches updates to existing records and merges the data by looking for common data in common fields (e.g., the same credit data provider account number, person/company account number, name, address, phone number, etc.).

In either event, data may be processed for skip tracing and reported back to the data provider 106. Skip tracing is the process of finding people (e.g., to collect on a debt). The data processing may be performed locally at the credit reporting transport server 107 and/or by another entity that specializes in skip tracing. For example, the credit reporting transport server 107 may send data to another server that matches records to determine that a person has a new address. That new address may then be sent to the data provider 106 (e.g., a collection agency) by the outside skip tracing service and/or by the credit reporting transport server 107.

For each record updated or submitted by the credit data provider 106, the credit reporting transport server 107 preferably performs an error checking routine as indicated in block 407. For example, a submitted record may be missing the social security number. In some instances, the credit reporting transport server 107 is able to correct the detected error(s). For example, if the social security number is missing from a record, and that social security number can be determined from other records (e.g., with the same account number, name, address, phone number, etc.), the credit reporting transport server 107 may complete the missing social security number automatically. If the credit reporting transport server 107 is not able to correct the error(s) associated with a record received from a credit data provider 106, then the credit reporting transport server 107 preferably stores the problematic record in the suspension queue 315 and notifies the credit data provider 106 that submitted the problematic record.

For non-problematic credit data, the credit reporting transport server 107 logs the update and/or sends the submitting credit data provider 106 an electronic receipt as indicated in block 408. For example, the credit data provider 106 may timestamp the changed data in the transport server database 112. Preferably, the electronic receipt indicates the delivery status (e.g., successful, pending, etc.) In this manner, if a person or company complains to the credit data provider 106 that one or more credit bureaus 104 are reporting incorrect data (e.g., issuing credit reports that do not reflect that the debt was paid off), the credit data provider 106 has some proof that the credit data provider 106 is not at fault.

The credit reporting transport server 107 may receive a plurality of these updates from a plurality of credit data providers 106 on a frequent basis (e.g., hundreds of updates form thousands of credit data providers 106 every day). Accordingly, the credit reporting transport server 107 preferably batches these updates together and sends them to one or more credit bureaus 104 each day as indicated in block 410. In addition, the credit reporting transport server 107 may merge data from different records together. For example, if the social security number is missing from a record, and that social security number can be determined from other records (e.g., with the same account number, name, address, phone number, etc.), the credit reporting transport server 107 may complete the missing social security number automatically.

In one embodiment, the submission from the credit reporting transport server 107 is merely a request to make the update. Each credit bureau 104 is still required to make the actual update to their database 110. In another embodiment, the credit reporting transport server 107 is authorized by one or more of the credit bureaus 104 to make the update directly to the credit bureau database 110.

For each record updated, the credit reporting transport server 107 preferably logs the update and/or sends the submitting credit data provider 106 an electronic receipt as indicated in block 412. This receipt and/or another receipt may indicate that the update was submitted to the credit bureau 104 and/or that the update was actually made in the credit bureau database 110. In either case, the credit bureau 104 preferably sends an acknowledgment to the credit reporting transport server 107 indicating that the update was made to the credit bureau database 110.

In summary, persons of ordinary skill in the art will readily appreciate that methods and apparatus for updating credit bureau data have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A credit reporting transport server comprising:
   a security module;
   a credit data provider user interface module operatively coupled to the security module;
   a database interface module operatively coupled to the security module;

a credit bureau update module operatively coupled to the database interface module, wherein the credit bureau update module sends updated data to a credit bureau in Metro2 data format; and a credit accounts data module operatively coupled to the database interface module.

2. The credit reporting transport server of claim 1, wherein the security module allows a credit data provider to view and update credit data associated with that credit data provider without allowing the credit data provider to view or update credit data associated with other credit data providers.

3. The credit reporting transport server of claim 1, wherein the credit data provider user interface module provides a user interface to a credit data provider computer that allows a user to view and update credit data associated with that credit data provide.

4. The credit reporting transport server of claim 3, wherein a web page is dynamically generated by the credit data provider user interface module, the web page allowing the user to query and update data stored in the credit accounts data module.

5. The credit reporting transport server of claim 1, wherein the credit bureau update module sends updated data to a credit bureau.

6. The credit reporting transport server of claim 1, wherein the credit bureau update module receives an acknowledgment from a credit bureau indicating that an update was made to a credit bureau database.

7. The credit reporting transport server of claim 1, wherein the credit bureau update module is authorized by a credit bureaus to make an update directly to a credit bureau database.

8. The credit reporting transport server of claim 1, wherein the credit accounts data module stores derogatory credit data as reported by a credit data provider.

* * * * *